(12) United States Patent
Nakamura et al.

(10) Patent No.: US 9,175,365 B2
(45) Date of Patent: Nov. 3, 2015

(54) METHOD OF RECOVERING PGM

(75) Inventors: Yuzuru Nakamura, Tokyo (JP); Minoru Kawasaki, Tokyo (JP); Katsunori Yamaguchi, Iwate (JP)

(73) Assignee: DOWA METALS & MINING CO., LTD., Tokyo (JP)

( * ) Notice: Subject to any disclaimer, the term of this patent is extended or adjusted under 35 U.S.C. 154(b) by 188 days.

(21) Appl. No.: 13/980,221

(22) PCT Filed: Jan. 13, 2012

(86) PCT No.: PCT/JP2012/050573
§ 371 (c)(1),
(2), (4) Date: Oct. 10, 2013

(87) PCT Pub. No.: WO2012/099009
PCT Pub. Date: Jul. 26, 2012

(65) Prior Publication Data
US 2014/0053687 A1 Feb. 27, 2014

(30) Foreign Application Priority Data
Jan. 18, 2011 (JP) .................................. 2011-008293

(51) Int. Cl.
*C22B 11/02* (2006.01)
*C22B 15/00* (2006.01)

(52) U.S. Cl.
CPC ............. *C22B 11/02* (2013.01); *C22B 11/021* (2013.01); *C22B 11/026* (2013.01); *C22B 15/0002* (2013.01); *C22B 15/0056* (2013.01); *C22B 15/0058* (2013.01); *Y02W 30/54* (2015.05)

(58) Field of Classification Search
CPC  C22B 11/026; C22B 11/021; C22B 15/0056; C22B 15/0058; C22B 15/002
See application file for complete search history.

(56) References Cited

U.S. PATENT DOCUMENTS

| 5,252,305 A | 10/1993 | Ezawa et al. |
| 2005/0166707 A1* | 8/2005 | Yamada et al. ............ 75/10.62 |
| 2011/0001279 A1 | 1/2011 | Yamada et al. |

FOREIGN PATENT DOCUMENTS

| JP | A-4-317423 | 11/1992 |
| JP | A-2000-248322 | 9/2000 |
| JP | A-2003-301225 | 10/2003 |
| JP | A-2004-68071 | 3/2004 |

(Continued)

OTHER PUBLICATIONS

Certified, Iso9001:2000. Material Safety Data Sheet Sodium Nitrate (n.d.): n. pag. Dec. 10, 2009. Web. Mar. 19, 2015. <http://www.labchem.com/tools/msds/msds/75547.pdf>.*
"Potassium Nitrate: Safety Data Sheet" Federal Register 77.58 (2004): n. pag. LabChem, Nov. 19, 2004. Web. Mar. 19, 2015. <http://www.labchem.com/tools/msds/msds/LC19818.pdf>.*

(Continued)

*Primary Examiner* — George Wyszomierski
*Assistant Examiner* — Tima M McGuthry Banks
(74) *Attorney, Agent, or Firm* — Oliff PLC (57) ABSTRACT

A method of suppressing a distribution of PGM into a Cu2O slag in an oxidation smelting of a method of recovering PGM, is provided, including: carrying out reduction smelting to a treatment target member containing PGM, Cu and/or $Cu_2O$, and flux, to thereby generate a molten slag and a Cu alloy containing PGM; and oxidizing and melting the Cu alloy containing the PGM, to thereby generate a $Cu_2O$ slag containing PGM and the Cu alloy, with more concentrated PGM concentration than the Cu alloy containing the PGM, wherein when carrying out the oxidation smelting, acidic oxide or basic oxide is added.

6 Claims, 10 Drawing Sheets

(56) References Cited

FOREIGN PATENT DOCUMENTS

| | | |
|---|---|---|
| JP | A-2004-270008 | 9/2004 |
| JP | A-2009-24263 | 2/2009 |

OTHER PUBLICATIONS

International Search Report issued in International Application No. PCT/JP2012/050573 on Mar. 27, 2012 (with translation).

* cited by examiner

METHOD OF RECOVERING PGM

TECHNICAL FIELD

The present invention relates to a method of recovering platinum group metals from each kind of member containing the platinum group metals, for example a catalyst for cleaning exhaust gas of a used car, used electronic substrates and lead frames, and used petrochemistry catalysts.

DESCRIPTION OF RELATED ART

For example, as a method of efficiently recovering platinum group metals from each kind of member containing the platinum group metals (described as "PGM" in the present invention in some cases), like the exhaust gas cleaning catalyst for the used car, inventors of the present invention disclose a dry-type recovering method of recovering PGM including heating and melting a treatment target member containing PGM together with a copper source material, and absorbing the PGM into a molten metal, and further disclose operability and a recovery ratio improving method (see patent document 1).

Patent document 1 discloses a recovering method (described as "ROSE process" in the present invention in some cases) of recovering PGM, wherein a treatment target member containing PGM and a copper source material containing copper oxide are charged into a sealed type electric furnace together with a flux component and a reducing agent, so as to be reduced and melted, then a molten metal essentially consisting of metal copper is settled under a molten slag layer essentially consisting of oxide, so that PGM is concentrated in the molten metal settled under the molten slag layer; and the molten metal in which the PGM is concentrated, is sorted from the molten slag and is shifted to another furnace in a molten state, and the molten metal is oxidized and melted in such another furnace, to thereby separate the layer into a slag layer essentially consisting of oxide and the molten metal layer in which the PGM is further concentrated, and in this dry-type recovering method of PGM, the molten slag layer with the content of copper reduced to ≤3.0 wr %, is discharged from the electric furnace, and further by water-cooling the molten slag generated in such another furnace from a high temperature state, a granular copper source material containing the copper oxide with a diameter of 0.1 to 10 mm is obtained.

PRIOR ART DOCUMENT

Patent document

Japanese Patent Laid Open Publication No. 2009-24263

SUMMARY OF THE INVENTION

Problem to be Solved by the Invention

Inventors of the present invention make strenuous efforts and pursuit a further efficient recovering method of recovering PGM from a treatment target member, without satisfying with the above-mentioned outcome.

As a result, a distribution ratio of PGM (platinum, rhodium, palladium) in $Cu_2O$-molten copper when carrying out the above-mentioned oxidation smelting, indicates a large value of about 100 times the value of the distribution ratio in $CaO$—$SiO_2$—$Al_2O_3$-based slag-molten copper, when carrying out the reduction smelting. Therefore, it is found that a considerable amount of PGM is distributed into a $Cu_2O$ slag in an oxidation furnace, which is generated in an oxidation smelting process of concentrating the PGM in copper. Then, since the considerable amount of PGM is distributed into the $Cu_2O$ slag in the oxidation furnace, the recovery ratio of the PGM as Cu-PGM alloy is suppressed, with a result that the PGM distributed into the $Cu_2O$ slag is circulated in a system of the ROSE process.

From the above-mentioned knowledge, it is found by the inventors of the present invention, that if the distribution of the PGM into the $Cu_2O$ slag can be suppressed in oxidation smelting, a PGM amount circulated in the system of the ROSE process can be suppressed, then the recovery ratio of the PGM can be improved, and the time required for the recovery can be shortened.

Therefore, a subject to be solved by the present invention is to provide a method of suppressing the distribution of the PGM to the $Cu_2O$ slag when carrying out the oxidation smelting in the PGM recovering method.

Means for Solving the Problem

As a result of further strenuous efforts by the inventors of the present invention, following breakthrough knowledge is obtained: namely, by adding $Na_2O$ being basic oxide or $SiO_2$ being acidic oxide as oxide when carrying out the oxidation smelting, the distribution of the PGM to the $Cu_2O$ slag can be suppressed. Thus, the present invention is completed.

Namely, in order to solve the above-mentioned subject, a first invention provides a method of recovering PGM, including:

carrying out reduction smelting to a treatment target member containing PGM, Cu and/or $Cu_2O$, and flux, to thereby generate a molten slag and a Cu alloy containing PGM; and oxidizing and melting the Cu alloy containing the PGM, to thereby generate the $Cu_2O$ slag containing PGM and the Cu alloy, with more concentrated PGM concentration than the Cu alloy containing the PGM, wherein when carrying out the oxidation smelting, acidic oxide or basic oxide is added.

A second invention provides the method of recovering PGM according to the first invention, wherein $SiO_2$ is used as the acidic oxide.

A third invention provides the method of recovering PGM according to the second invention, wherein $SiO_2$ content in the $Cu_2O$ slag containing the PGM, is set to 0.01 mass % or more and 10.0 mass % or less by adding the $SiO_2$.

A fourth invention provides the method of recovering PGM according to the first invention, wherein at least one kind selected from a group consisting of $Na_2O$, $Na_2CO_3$, and $NaHCO_3$, is used as the basic oxide.

A fifth invention provides the method of recovering PGM according to claim 4, wherein $Na_2O$ conversion content of the basic oxide in the $Cu_2O$ slag containing the PGM, is set to 0.01 mass % or more and 20.0 mass % or less.

A sixth invention provides the method of recovering PGM according to any one of the first to fifth inventions, wherein the $Cu_2O$ slag containing PGM generated in the oxidation smelting process, is charged to a reduction smelting process performed thereafter.

Advantage of the Invention

According to the present invention, when carrying out the oxidation smelting, distribution of the PGM to the $Cu_2O$ slag is suppressed, and a degree of the PGM concentration into the Cu alloy is increased, and therefore productivity of recovering PGM can be increased.

MODES FOR CARRYING OUT THE INVENTION

First, a ROSE process of a conventional technique will be briefly described, with reference to the drawings.

Figure 2:
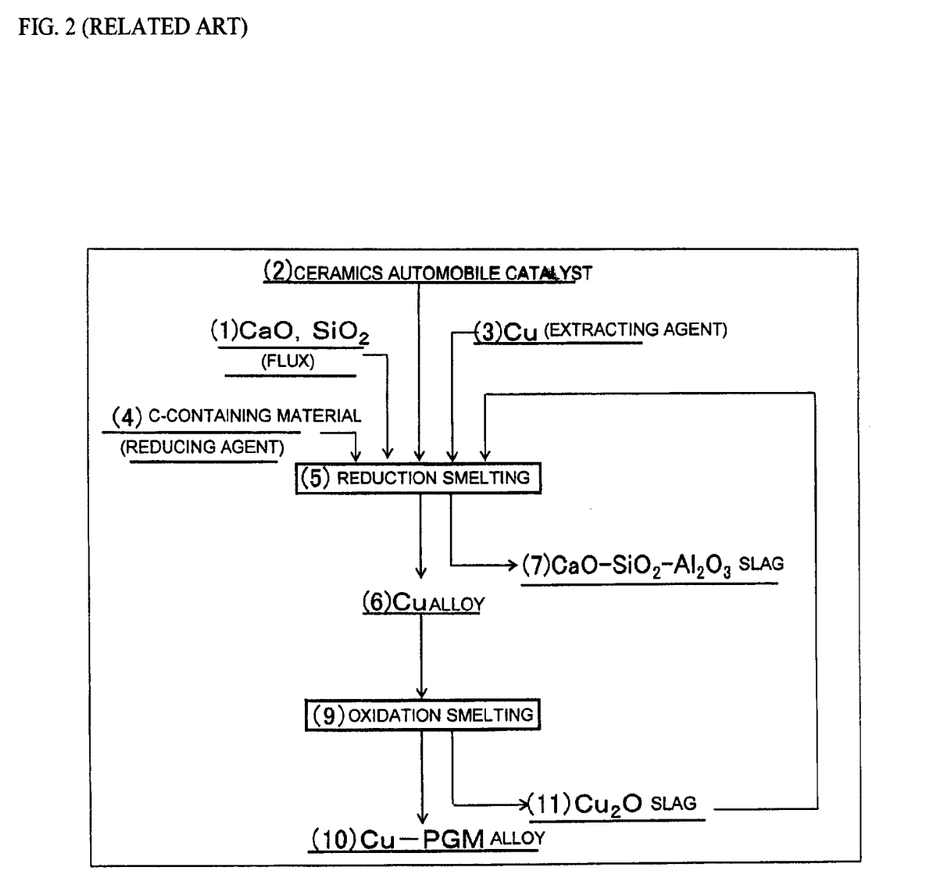
FIG. 2 is a step flowchart of the PGM recovery according to a conventional technique.

FIG. 2 is a flowchart of a ROSE process according to a conventional technique.

A treatment target member containing PGM (for example, ceramics automobile catalyst (2)), Cu (3) being an extracting agent, flux (CaO, $SiO_2$ (1)), and a C-containing material (4) being a reducing agent, are charged into a reducing furnace, to thereby carry out reduction smelting (5). Then, a molten metal of the Cu alloy (6) is settled under a molten slag (CaO—$SiO_2$—$Al_2O_3$ slag (7)) layer essentially composed of oxide, and PGM is concentrated into the Cu alloy (6) settled thereunder. Meanwhile, CaO—$SiO_2$—$Al_2O_3$ slag in which Cu content is reduced to 3.0 mass % or less, is discharged from the electric furnace.

By shifting the Cu alloy (6), in which PGM is concentrated, to the oxidation furnace in a molten state, and applying the oxidation smelting (9) thereto, a layer is divided into a $Cu_2O$ slag (11) layer mainly composed of oxide, and a molten metal (Cu-PGM alloy (10)) layer in which the PGM is further concentrated.

The $Cu_2O$ slag (11) layer mainly composed of oxide generated on a surface of molten metal, is discharged to outside of the furnace, and oxidation treatment and discharge treatment of the oxide layer are repeated in the oxidation furnace, to thereby concentrate the PGM content in the molten metal (Cu-PGM alloy (10)) layer in which the PGM is further concentrated, until the concentration of the PGM is 10 to 75%.

However, as described above, the distribution ratio of platinum, rhodium, and palladium in the $Cu_2O$ slag (11)-Cu-PGM alloy (10) when carrying out the oxidation smelting, is a large value of about 100 times the distribution ratio in CaO—$SiO_2$—$Al_2O_3$ slag (7)-Cu alloy (6) when carrying out the reduction smelting (5). Therefore, a considerable amount of PGM is distributed into the $Cu_2O$ slag (11) generated in a process of concentrating the PGM in the Cu alloy. As a result, the considerable amount of PGM contained in the initial treatment target member (for example, ceramics automobile catalyst (2)) is distributed into the $Cu_2O$ slag generated when carrying out the oxidation smelting (9). The $Cu_2O$ slag (11) is returned to the reduction smelting (5), and therefore the recovering ratio of PGM as Cu-PGM alloy (10) is suppressed, and the PGM distributed into the $Cu_2O$ slag is circulated in the system of the ROSE PROCESS.

It is found by the inventors of the present invention, that the distribution of PGM to the generated $Cu_2O$ slag can be reduced by adding oxide, when carrying out oxidation smelting (9).

Therefore, first, as a preliminary test, $Na_2O$ being the basic oxide, or $SiO_2$ being the acidic oxide, is added to the $Cu_2O$ slag as oxide, and the distribution of Pt, Rh, and Pd in $Cu_2O$ melt-molten copper is measured at 1250° C.

A measurement test method will be described.

<Preparation of a Sample>

5 g of metal Cu and 5 g of $Cu_2O$ regarded as slag, were weighed. Then, $SiO_2$ or $Na_2CO_3$ were weighed so that $SiO_2$, $Na_2O$ content were 0 mass %, 2 mass %, 5 mass %, and 7 mass %, with respect to the mass of $Cu_2O$ regarded as the slag. Next, 100 mg of Pt, Rh, and Pd, which was 1 mass %, were weighed, with respect to 5 g of metal Cu and 5 g of $Cu_2O$ regarded as the slag, namely 10 g of them in total.

Then, $SiO_2$ or $Na_2CO_3$ weighed as oxidizing agent, were respectively added into a sample in which metal Cu and $Cu_2O$ were mixed, and weighed Pt, Rh, and Pd were further added to each of the obtained samples.

<Melting of Samples>

Final samples were respectively charged into magnesia crucible, and were melted and retained for 1 hour at 1250° C.

The sample obtained by being melted, retained, and cooled, was separated into a metal copper phase and a slag phase.

Regarding a composition analysis of the metal copper phase and the slag phase in the sample after being melted, $Na_2O$ was quantitatively determined using atomic absorption spectrometry, and the other element was quantitatively analyzed by an ICP-AES method.

<Measurement Result>

First, PGM distribution ratio in the $Cu_2O$-based slag and the Cu alloy was measured, in the case of not adding oxide at 1250° C.

Results thereof are shown in table 1.

TABLE 1

| Pt | Rh | Pd |
|------|-------|-------|
| 0.05 | 0.008 | 0.025 |

Figure 3:
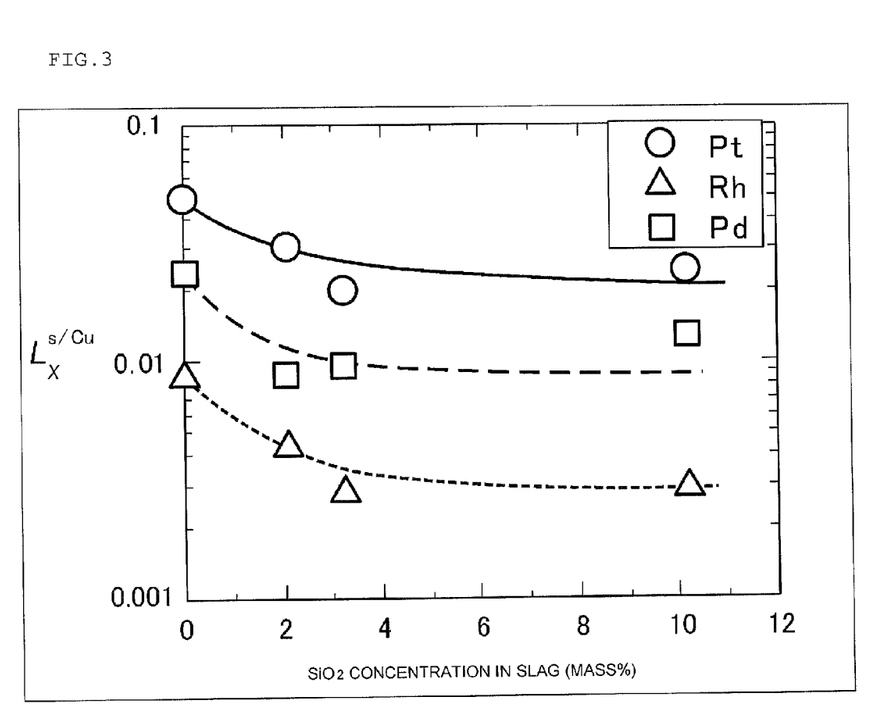
FIG. 3 is a graph showing a distribution ratio of Pt, Rh, and Pd in $Cu_2O$—$SiO_2$ based slag and molten copper.

Next, FIG. 3 shows the distribution ratio of Pt, Rh, Pd in the $Cu_2O$ slag and the Cu alloy in the case of adding $SiO_2$ as oxide.

FIG. 3 is a graph in which $L^{s/Cu}_x$ logarithmic value is taken on the vertical axis, and the concentration of $SiO_2$ in the $Cu_2O$ slag is taken on the horizontal axis by mass %, wherein Pt is plotted by ○ and connected by solid line, and Rh is plotted by Δ and connected by short broken line, and Pd is plotted by □ and connected by long broken line.

Note that $L^{s/Cu}_x$ is the PGM distribution ratio in the $Cu_2O$-based slag and molten copper, and is defined by (formula 1).

$$L^{s/Cu}_x = (\text{mass \% of } X \text{ in the slag phase})/[\text{mass \% of } X \text{ in the molten copper phase}] \quad \text{(Formula 1)}$$

Wherein X indicates Pt, Rh, Pd, and ( ) indicates a value related to the slag phase, and [ ] indicates a value related to the molten copper phase.

From FIG. 3, it is found that the distribution ratio of Pt, Rh, Pd is reduced, with increase of $SiO_2$ addition concentration to an oxidation smelting process. The distribution ratio of Pt, Rh, Pd of the $Cu_2O$ slag containing 3 to 4 mass % of $SiO_2$, is a value of ⅓ to ½ of pure $Cu_2O$ slag, and is stabilized from 5 mass % or more. Further, it is confirmed that the distribution ratio is reduced to 10 mass % level of $SiO_2$.

Therefore, addition of $SiO_2$ with respect to the weight of the $Cu_2O$ slag in the oxidation smelting process, may be adjusted in a range of 0.01 to 10.0 mass %, preferably 2.0 to 8.0 mass %, and more preferably 3.0 to 5.0 mass %. Thus, the PGM amount distributed to the $Cu_2O$ slag is suppressed, and a recovering efficiency of PGM can be increased. Note that when the $SiO_2$ addition amount exceeds 10.0 mass %, an addition effect is easily saturated.

Figure 4:
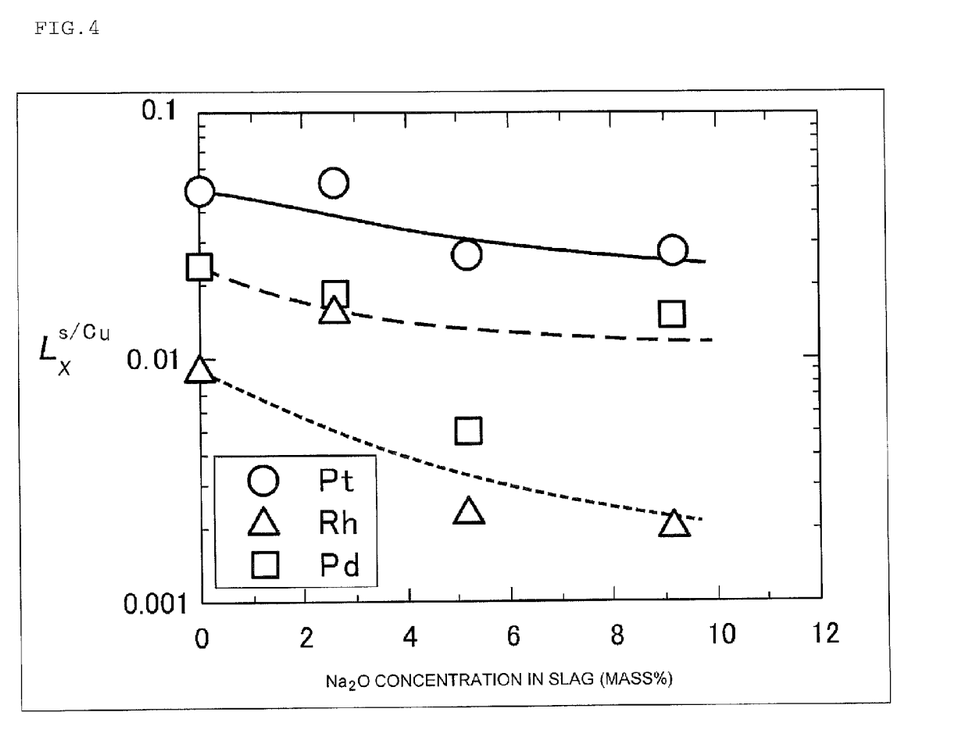
FIG. 4 is a graph showing the distribution ratio of Pt, Rh, and Pd in $Cu_2O$—$Na_2O$ based slag and molten copper.

Further, FIG. 4 shows the distribution ratio of Pt, Rh, Pd in the $Cu_2O$ slag and the Cu alloy in the case of adding $Na_2O$ as oxide.

Similarly to FIG. 3, FIG. 4 is a graph in which $L^{s/Cu}_x$ logarithmic value is taken on the vertical axis, and the concentration of $SiO_2$ in the $Cu_2O$ slag is taken on the horizontal axis by mass %, wherein Pt is plotted by ○ and connected by solid line, and Rh is plotted by △ and connected by short broken line, and Pd is plotted by □ and connected by long broken line.

From FIG. 4, it is found that the distribution ratio of Pt, Rh, Pd is reduced, with increase of $Na_2O$ concentration in the slag before the oxidation smelting process. The distribution ratio of Pt, Rh, Pd of the $Cu_2O$ slag containing 5 mass % of $Na_2O$, is a value of ⅘ to ⅓ of pure $Cu_2O$ slag, and is stabilized from 9 mass % or more. Further, it is confirmed that the distribution ratio is reduced to 20 mass % level of $Na_2O$.

Therefore, in the oxidation smelting process, a basic oxide content ($Na_2O$ conversion content of the basic oxide) converted to $Na_2O$ in the weight of the $Cu_2O$ slag, may be adjusted in the range of 0.01 to 20.0 mass %, preferably 5.0 to 20.0 mass %, and more preferably 9.0 to 10.0 mass %. Thus, the PGM amount distributed to the $Cu_2O$ slag is suppressed, and the recovering efficiency of PGM can be increased. Note that when the $Na_2O$ conversion content of the basic oxide exceeds 20.0 mass %, an addition effect is easily saturated.

From the above-mentioned test result, it is found that by adding $SiO_2$ being the acidic oxide or $Na_2O$ being the basic oxide as oxide when carrying out oxidation smelting, the distribution ratio of PGM in the $Cu_2O$ slag and the Cu alloy is small compared with a case that the oxide is not added, and the PGM concentration in the $Cu_2O$ slag can be reduced.

Here, brief explanation is given for a consideration why the distribution ratio of PGM in the $Cu_2O$ slag and the molten copper is reduced in the $Cu_2O$ slag to which oxide is added.

The distribution ratio of PGM in $Al_2O_3$—CaO—$SiO_2$ based slag and the Cu alloy, becomes small, with reduction of an oxygen partial pressure. It seems that this is because the oxide of PGM is hardly generated due to the reduction of the oxygen partial pressure and a copper dissolution degree in the slag becomes small. The degree of the dissolution into the molten $Cu_2O$ slag of PGM is large, compared with the $Al_2O_3$—CaO—$SiO_2$ slag. Therefore, it can be considered that an attractive force works between the PGM and the $Cu_2O$ slag, although this is an abstract expression.

Meanwhile, it is known that $Na_2O$ is the basic oxide, $SiO_2$ is the acidic oxide, and $Cu_2O$ is neutral oxide (amphoteric oxide). It can be considered that a property of the $Cu_2O$ slag is changed by adding strongly basic $Na_2O$ or strongly acid $SiO_2$ into $Cu_2O$ which is the amphoteric oxide, and a bonding force by neutralization occurs between the $Cu_2O$, and $Na_2O$ or $SiO_2$, and therefore an attractive force between the $Cu_2O$ and the PGM is relatively weakened. Thus, it can be considered that the attractive force between the $Cu_2O$ and the PGM is weakened, and therefore the PGM is hardly distributed to the $Cu_2O$ slag.

Here, brief explanation is given for the ROSE process of the present invention, with reference to the drawings.

Figure 1:
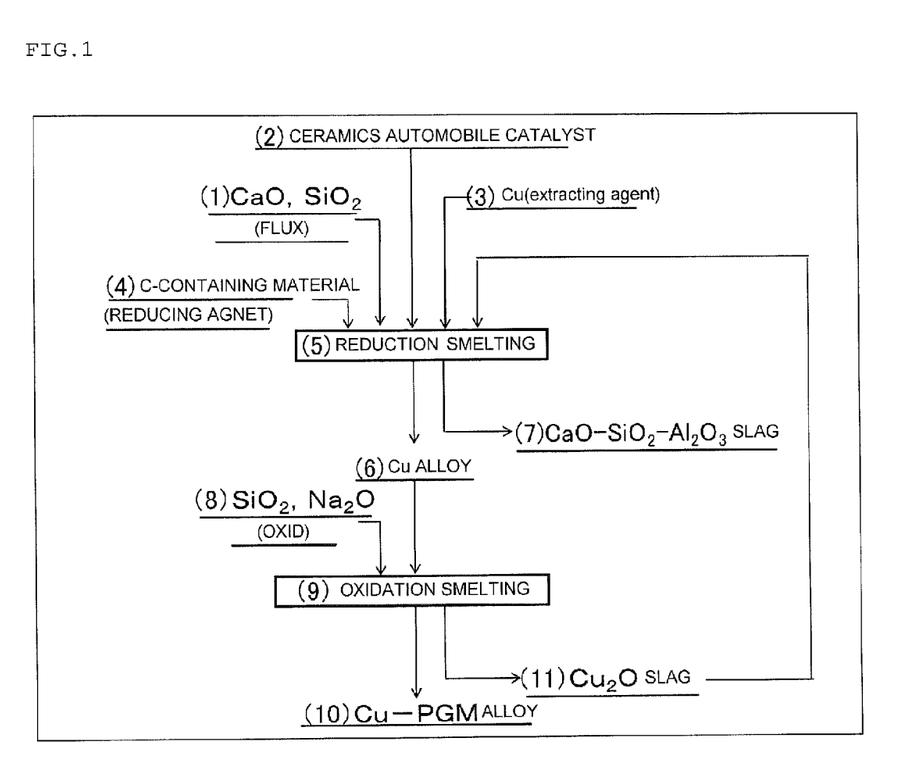
FIG. 1 is a step flowchart of PGM recovery according to the present invention.

FIG. 1 is a flowchart of the ROSE process of the present invention.

The treatment target member containing PGM (for example, ceramics automobile catalyst (2)), Cu (3) being an extracting agent, flux (CaO, $SiO_2$ (1)), and a C-containing material (4) being a reducing agent, are charged into a reducing furnace, to thereby carry out reduction smelting (5). Then, a molten metal of the Cu alloy (6) is settled under a molten slag (CaO—$SiO_2$—$Al_2O_3$ slag (7)) layer essentially composed of oxide, and platinum group metals are concentrated in the Cu alloy (6) settled thereunder. Meanwhile, the CaO—$SiO_2$—$Al_2O_3$ slag (7) in which Cu content is reduced to 3.0 mass % or less, is discharged from the electric furnace, similarly to the ROSE process of the conventional technique.

When the Cu alloy (6) in which PGM is concentrated, is shifted to the oxidation furnace in the molten state and the oxidation smelting (9) is applied thereto, $SiO_2$ or $Na_2O$ is added as the above-mentioned oxide (8), to thereby separate the layer into the $Cu_2O$ slag (11) layer mainly composed of oxide, and the molten metal (Cu-PGM alloy (10)) layer in which the PGM is further concentrated. Then, the $Cu_2O$ slag (11) is returned to the reduction smelting (5).

Here, the distribution ratio of PGM in the $Cu_2O$ slag (11) and the Cu-PGM alloy (10) becomes small by adding oxide (8), compared with a case that the oxide (8) is not added, and therefore the PGM concentration in the $Cu_2O$ slag (11) can be reduced. As a result, the PGM amount circulated in the ROSE process can also be reduced.

EXAMPLES

Based on the above-mentioned test result, a distribution behavior of Pt in the ROSE process of the present invention is examined.

Example 1

In example 1, an $Al_2O_3$ automobile catalyst (ceramics automobile catalyst) as the treatment target member was pulverized, and a quantitative analysis was performed by the ICP-AES method after reduction. As a result, it was found that 0.5 mass % of Pt was contained.

An operation condition for example 1 will be described.
<1> 853 kg, and 995 kg of CaO, $SiO_2$ (1) were prepared respectively as flux.
<2> 1000 kg of the $Al_2O_3$ automobile catalyst (2) was used as the treatment target member.
<3> 100 kg of Cu (3) was used as the extracting agent.
<4> $SiO_2$ (8) was used as oxide contained in the $Cu_2O$ slag. Mass % of ($SiO_2$) was adjusted to three levels of 2 mass %, 5 mass %, and 0 mass %.

Figure 5:
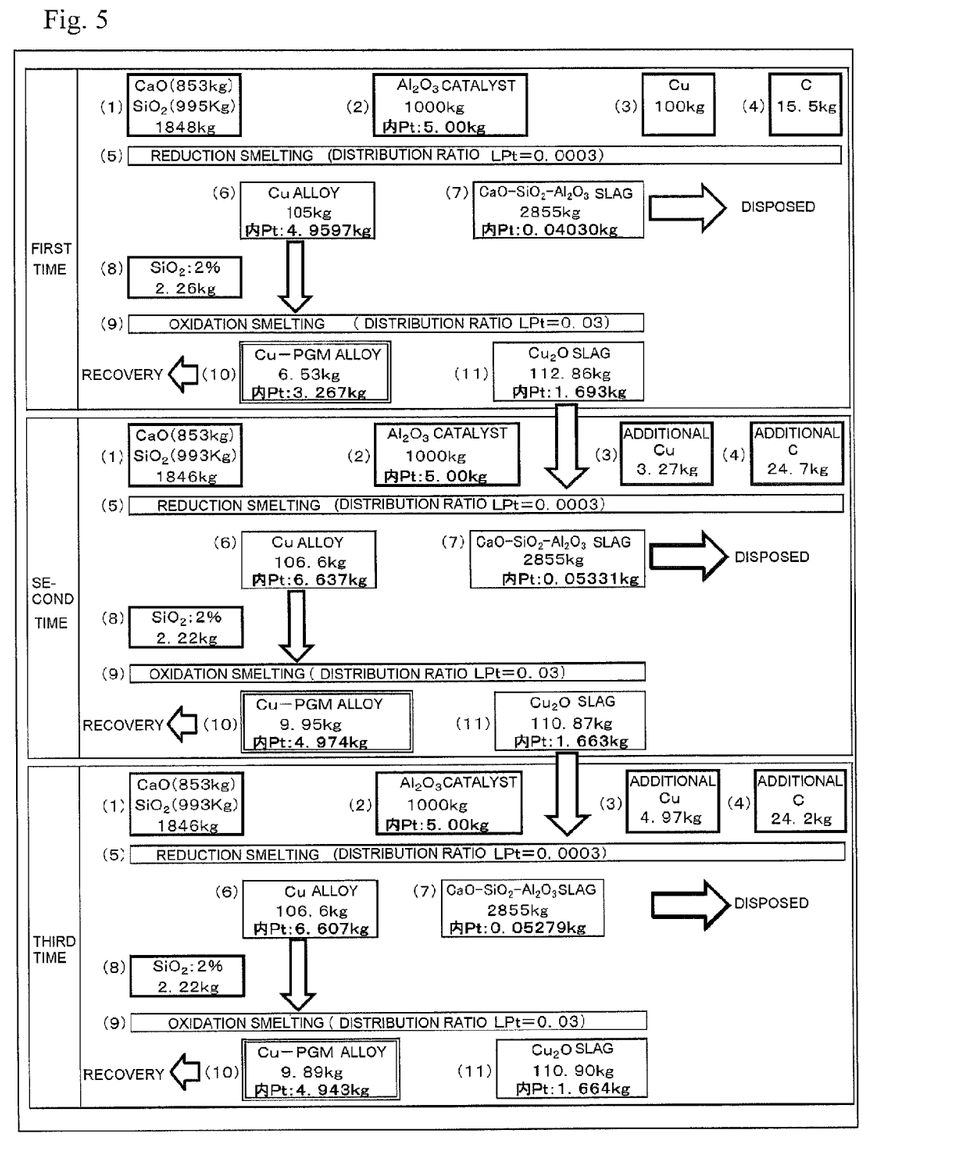
FIG. 5 is a mass flowchart in a case of setting $SiO_2$ addition amount to 2 mass % as acidic oxide, and setting Cu amount to 100 kg.

<5> Cokes (4) was added as the reducing agent, by an amount described later according to the amount of the oxide.
<Case of 2 Mass % of $SiO_2$>
The distribution behavior of Pt in the ROSE process of the present invention will be described, with reference to FIG. 5.

853 kg, 995 kg of CaO and $SiO_2$ (1) as flux (prepared so that a slag composition was CaO:30 mass %, and $SiO_2$:35 mass %.), and 1000 kg of $Al_2O_3$ automobile catalyst (2) as the treatment target member, 100 kg of Cu (3) as the extracting agent, and 15.5 kg of cokes (4) as the reducing agent, were prepared when carrying out a first reduction smelting (5).

They were charged into an electric furnace, and retained under reducing atmosphere, at 1450° C., for 6 hours, in a sealed state, to thereby carry out the first reduction smelting (5). As a result, the molten metal of the Cu alloy (6) was settled under the $CaO$—$SiO_2$—$Al_2O_3$ slag (7). The Pt amount in the $CaO$—$SiO_2$—$Al_2O_3$ was 0.04030 kg, and the Pt amount in the Cu alloy (6) was 4.9597 kg. By using these values, 0.0003 of the distribution ratio of Pt was obtained in the reduction smelting (5) calculated by the above-mentioned formula (1).

The molten metal of the Cu alloy (6) was shifted to the oxidation furnace, and 2.26 kg of $SiO_2$ (8) was added thereto so that the content of the $SiO_2$ (8) was 2 mass % with respect to the $Cu_2O$ slag, on the premise that a mass ratio of the Cu alloy (6) and the $Cu_2O$ slag (11) was around 1:17, and was retained for 6 hours at 1300° C. under oxidation atmosphere condition in which 40% oxygen was flowed therein at 30 L/h.

Meanwhile, the $CaO$—$SiO_2$—$Al_2O_3$ slag (7) was discarded.

As a result, the Cu-PGM alloy (10) was settled under the $Cu_2O$ slag (11) layer. The Pt amount in the $Cu_2O$ slag (11) was 1.693 kg. The Pt amount in the Cu-PGM alloy (10) was 3.267 kg, and 50% Pt was contained therein. The distribution ratio of Pt in this oxidation smelting (9) calculated using the above-mentioned values, was 0.03.

The obtained $Cu_2O$ slag (11), CaO and $SiO_2$ (1) as flux (wherein CaO:30 mass % and $SiO_2$:35 mass % were prepared as slug compositions), 1000 kg of $Al_2O_3$ automobile catalyst (2) as the treatment target member, additional Cu (3) as the extracting agent, and cokes (4) as the reducing agent, were prepared.

Here, 96.73 kg of Cu and 2.26 kg of $SiO_2$ were contained in the $Cu_2O$ slag (11). Therefore, 853 kg, 993 kg of CaO and $SiO_2$ (1) were prepared as flux, and 3.27 kg of Cu (3) was prepared as the extracting agent, and 24.7 kg of cokes (4) was prepared as the reducing agent.

They were charged into the electric furnace, and a second reduction smelting (5) was carried out under the same condition as the first time, excluding a point that 24.7 kg of cokes (4) was used as the reducing agent. As a result, the molten metal of the Cu alloy (6) was settled under the $CaO$—$SiO_2$—$Al_2O_3$ slag (7) layer. The Pt amount in the $CaO$—$SiO_2$—$Al_2O_3$ slag (7) layer was 0.05301 kg, and the Pt amount in the Cu alloy (6) was 6.637 kg. The distribution ratio of Pt in the reduction smelting (5) calculated using these values, was 0.0003.

The molten metal of the Cu alloy (6) was shifted to the oxidation furnace, and 2.22 kg of $SiO_2$ (8) was added, so that the content of the $SiO_2$ (8) was 2 mass % with respect to the $Cu_2O$ slag, on the premise that the mass ratio of the Cu alloy (6) and the $Cu_2O$ slag (11) was around 1:11, and a second oxidation smelting (9) was carried out under the same condition as the first time. Meanwhile, the $CaO$—$SiO_2$—$Al_2O_3$ slag (7) was discarded.

As a result, the Cu-PGM alloy (10) was settled under the $Cu_2O$ slag (11) layer.

The Pt amount in the $Cu_2O$ slag (11) was 1.663 kg. The Pt amount in the Cu-PGM alloy (10) was 4.974 kg, and 50% Pt was contained therein. The distribution ratio of Pt in this oxidation smelting (9) calculated using the above-mentioned values, was 0.03.

The obtained $Cu_2O$ slag (11), CaO and $SiO_2$ (1) as flux (wherein CaO:30 mass % and $SiO_2$:35 mass % were prepared as slug compositions), 1000 kg of $Al_2O_3$ automobile catalyst (2) as the treatment target member, and additional Cu (3) as the extracting agent, were prepared.

Here, 95.03 kg of Cu and 2.22 kg of $SiO_2$ were contained in the $Cu_2O$ slag (11). Therefore, 853 kg, 993 kg of CaO and $SiO_2$ (1) were prepared as flux, and 4.97 kg of Cu (3) was prepared as the extracting agent.

They were charged into the electric furnace, and a reduction smelting (5) was carried out three times under the same condition as the first time, excluding a point that 24.2 kg of cokes (4) was used as the reducing agent. As a result, the molten metal of the Cu alloy (6) was settled under the $CaO$—$SiO_2$—$Al_2O_3$ slag (7) layer. The Pt amount in the $CaO$—$SiO_2$—$Al_2O_3$ slag (7) layer was 0.05279 kg, and the Pt amount in the Cu alloy (6) was 6.607 kg. The distribution ratio of Pt in the reduction smelting (5) calculated using these values, was 0.0003.

The molten metal of the Cu alloy (6) was shifted to the oxidation furnace, and further 2.22 kg of $SiO_2$ (8) was added thereto, so that the content of the $SiO_2$ (8) was 2 mass % with respect to the $Cu_2O$ slag, on the premise that the mass ratio of the Cu alloy (6) and the $Cu_2O$ slag (11) was around 1:11, and a third oxidation smelting (9) was carried out under the same condition as the first time. Meanwhile, the $CaO$—$SiO_2$—$Al_2O_3$ slag (7) was discarded.

As a result, the Cu-PGM alloy (10) was settled under the $Cu_2O$ slag (11) layer. The Pt amount in the $Cu_2O$ slag (11) was 1.664 kg. The Pt amount in the Cu-PGM alloy (10) was 4.943 kg, and 50% Pt was contained therein. The distribution ratio of Pt in this oxidation smelting (9) calculated using these values, was 0.03.

As described above, 3000 kg (Pt:15 kg) of the $Al_2O_3$ automobile catalyst (2) was treated by reduction smelting (5) and oxidation smelting (9) three times, to thereby obtain 13.184 kg of Pt in the Cu-PGM alloy (10) in total (first 3.267 kg+second 4.974 kg+third 4.943 kg), as Pt in the Cu-PGM alloy (10). Meanwhile, Pt in the ROSE process was 1.664 kg.

Figure 6:
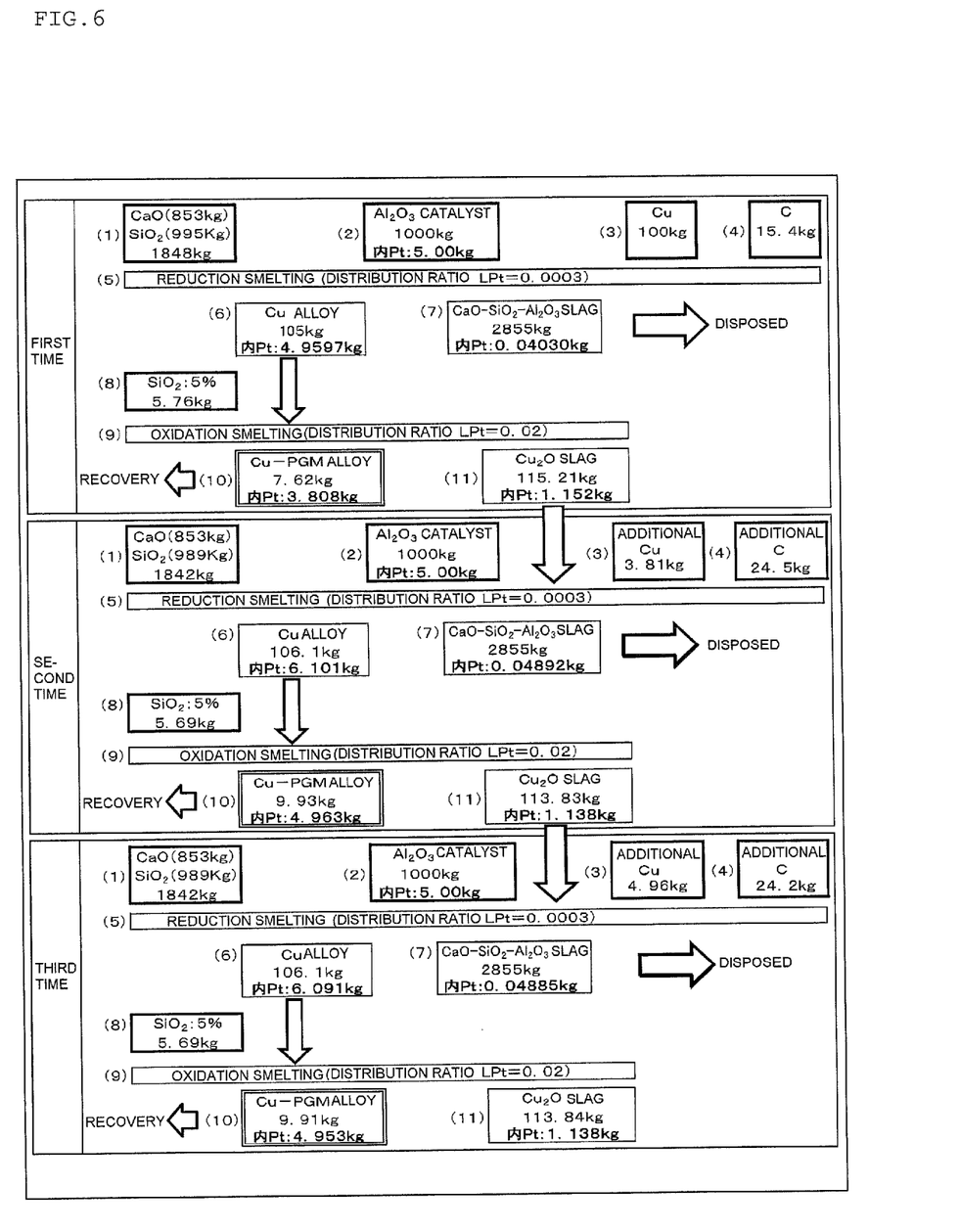
FIG. 6 is a mass flowchart in a case of setting $SiO_2$ addition amount to 5 mass % as acidic oxide, and setting Cu amount to 100 kg.

<A Case of 5 Mass % of $SiO_2$>
Next, with reference to FIG. 6, explanation is given for the distribution behavior of Pt in the ROSE process of the present invention in a case that the $SiO_2$ (8) content is set to 5 mass %, which is the oxide in the $Cu_2O$ slag (11) containing PGM.

Note that FIG. 6 is a view showing a mass flow when the addition amount of $SiO_2$ (8) as oxide, is set to 5 mass %, which is the above-mentioned operation condition.

Similarly to the above-mentioned <the case of 2 mass % of $SiO_2$>, 853 kg, 995 kg of CaO and $SiO_2$ (1) as the flux (prepared so that the slag composition was CaO:30 mass %, and $SiO_2$:35 mass %.), 1000 kg of $Al_2O_3$ automobile catalyst (2) as the treatment target member, 100 kg of Cu (3) as the extracting agent, and 15.4 kg of cokes as the reducing agent, were prepared when carrying out a first reduction smelting (5).

They were charged into the electric furnace, to thereby carry out the first reduction smelting (5) similarly to <the case of 2 mass % of $SiO_2$>. As a result, the molten metal of the Cu alloy (6) was settled under the $CaO$—$SiO_2$—$Al_2O_3$ slag (7). The Pt amount in the $CaO$—$SiO_2$—$Al_2O_3$ was 0.04030 kg, and the Pt amount in the Cu alloy (6) was 4.9597 kg. By using these values, 0.0003 of the distribution ratio of Pt was calculated in the reduction smelting (5).

The molten metal of the Cu alloy (6) was shifted to the oxidation furnace, and 5.76 kg of $SiO_2$ (8) was added so as to be 5 mass % with respect to the $Cu_2O$ slag, on the premise that the mass ratio of the Cu alloy (6) and the $Cu_2O$ slag (11) was around 1:15, to thereby carrying out the first oxidation smelting (9) similarly to <the case of 2 mass % of $SiO_2$>. Meanwhile, the $CaO$—$SiO_2$—$Al_2O_3$ slag (7) was discarded.

As a result, the Cu-PGM alloy (10) was settled under the $Cu_2O$ slag (11) layer. The Pt amount in the $Cu_2O$ slag (11) was 1.152 kg. The Pt amount in the Cu-PGM alloy (10) was 3.808 kg, and 50% Pt was contained therein. The distribution ratio of Pt in this oxidation smelting (9) calculated using the above-mentioned values, was 0.02.

The obtained $Cu_2O$ slag (11), CaO and $SiO_2$ (1) as flux, 1000 kg of $Al_2O_3$ automobile catalyst (2) as the treatment target member, and additional Cu (3) as the extracting agent, were prepared.

Here, 96.19 kg of Cu and 5.76 kg of $SiO_2$ were contained in the $Cu_2O$ slag (11). Therefore, 853 kg, 989 kg of CaO and $SiO_2$ (1) were prepared as flux, and 3.81 kg of Cu was prepared as the extracting agent.

They were charged into the electric furnace, and the second reduction smelting (5) was carried out under the same condition as the first time, excluding a point that 24.5 kg of cokes (4) was used as the reducing agent. As a result, the molten metal of the Cu alloy (6) was settled under the $CaO$—$SiO_2$—$Al_2O_3$ slag (7) layer. The Pt amount in the $CaO$—$SiO_2$—$Al_2O_3$ slag (7) layer was 0.04892 kg, and the Pt amount in the Cu alloy (6) was 6.101 kg. The distribution ratio of Pt in the reduction smelting (5) calculated using these values, was 0.0003.

The molten metal of the Cu alloy (6) was shifted to the oxidation furnace, and 5.69 kg of $SiO_2$ (8) was added so as to be 5 mass % with respect to the $Cu_2O$ slag, on the premise that the mass ratio of the Cu alloy (6) and the $Cu_2O$ slag (11) was around 1:11, to thereby carry out the second oxidation smelting (9) under the same condition as the first time. Meanwhile, the $CaO$—$SiO_2$—$Al_2O_3$ slag (7) was discarded.

As a result, the Cu-PGM alloy (10) containing 50% Pt was settled under the $Cu_2O$ slag (11) layer. The Pt amount in the $Cu_2O$ slag (11) was 1.138 kg. The Pt amount in the Cu-PGM alloy (10) was 4.963 kg, and 50% Pt was contained therein. The distribution ratio of Pt in this oxidation smelting (9) calculated using the above-mentioned values, was 0.02.

The obtained $Cu_2O$ slag (11), CaO and $SiO_2$ (1) as flux, 1000 kg of $Al_2O_3$ automobile catalyst (2) as the treatment target member, and additional Cu (3) as the extracting agent, were prepared.

Here, 95.04 kg of Cu and 5.69 kg of $SiO_2$ were contained in the $Cu_2O$ slag (11). Therefore, 853 kg, 989 kg of CaO and $SiO_2$ (1) were prepared as flux, and 4.96 kg of Cu was prepared as the extracting agent.

They were charged into the electric furnace, and the reduction smelting (5) was carried out three times under the same condition as the first time, excluding the point that 24.2 kg of cokes (4) was used as the reducing agent. As a result, the molten metal of the Cu alloy (6) was settled under the $CaO$—$SiO_2$—$Al_2O_3$ slag (7) layer. The Pt amount in the $CaO$—$SiO_2$—$Al_2O_3$ slag (7) layer was 0.04885 kg, and the Pt amount in the Cu alloy (6) was 6.091 kg. The distribution ratio of Pt in the reduction smelting (5) calculated using these values, was 0.0003.

The molten metal of the Cu alloy (6) was shifted to the oxidation furnace, and 5.69 kg of $SiO_2$ (8) was added so as to be 5 mass % with respect to the $Cu_2O$ slag, on the premise that the mass ratio of the Cu alloy (6) and the $Cu_2O$ slag (11) was around 1:11, to thereby carry out the third oxidation smelting (9) under the same condition as the first time. Meanwhile, the $CaO$—$SiO_2$—$Al_2O_3$ slag (7) was discarded.

As a result, the Cu-PGM alloy (10) was settled under the $Cu_2O$ slag (11) layer. The Pt amount in the $Cu_2O$ slag (11) was 1.138 kg. The Pt amount in the Cu-PGM alloy (10) was 4.953 kg, and 50% Pt was contained therein. The distribution ratio of Pt in this oxidation smelting (9) calculated using the above-mentioned values, was 0.02.

As described above, 3000 kg (Pt:15 kg) of the $Al_2O_3$ automobile catalyst (2) was treated by the reduction smelting (5) and oxidation smelting (9) three times, to thereby obtain 13.724 kg of Pt in the Cu-PGM alloy (10) in total (first 3.808 kg+second 4.963 kg+third 4.953 kg) as Pt in the Cu-PGM alloy (10). Meanwhile, Pt in the ROSE process was 1.138 kg.

<The Case of 0 Mass % of $SiO_2$>

Figure 7:
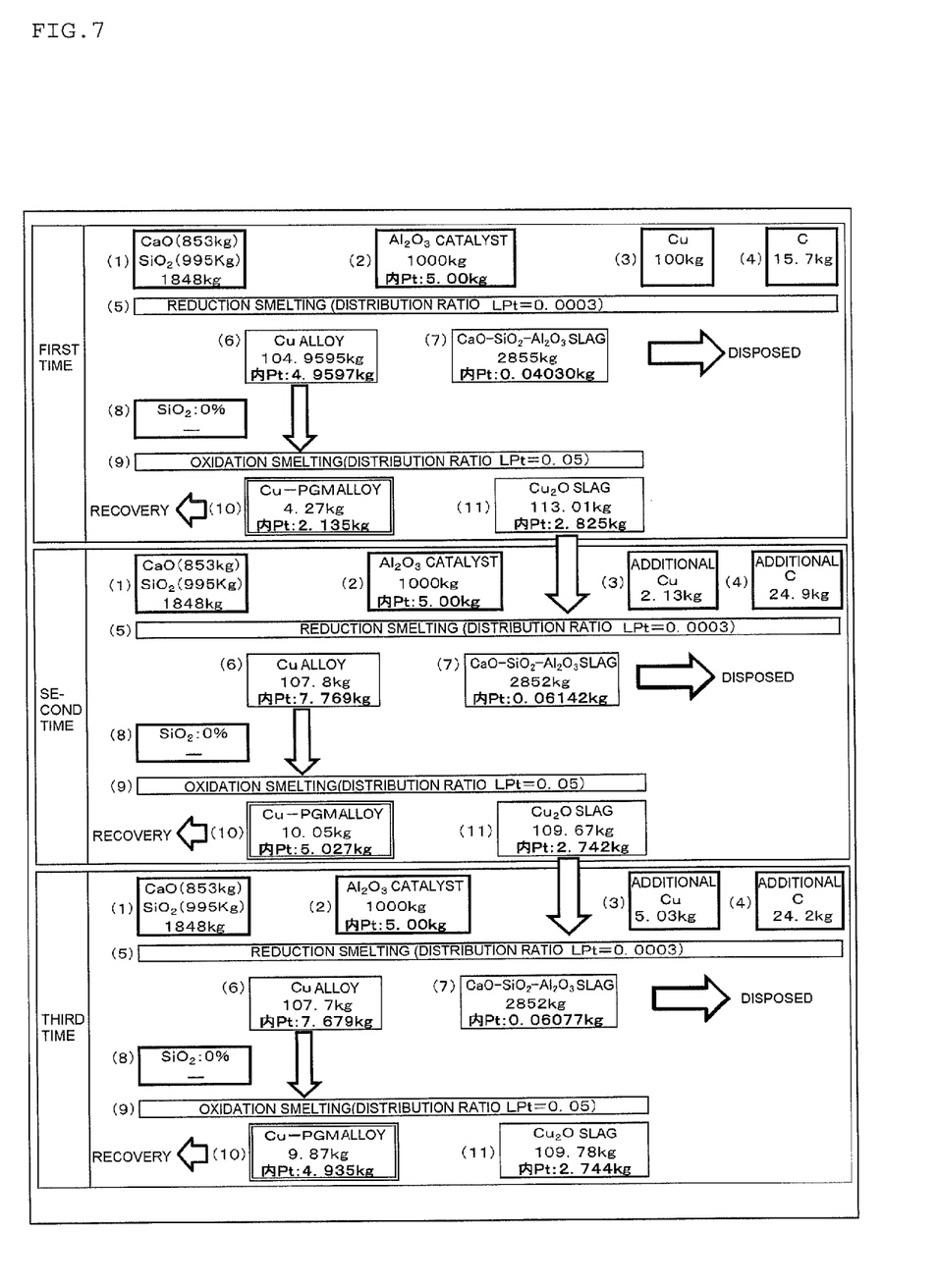
FIG. 7 is a mass flowchart in a case of setting the Cu amount to 100 kg without adding $SiO_2$ as the acidic oxide.

Next, with reference to FIG. 7, explanation is given for the distribution behavior of Pt in the ROSE process of the present invention in the case that the $SiO_2$ (8) content is not added as oxide.

Note that FIG. 7 is a view showing a mass flow when the $SiO_2$ (8) is not added as oxide, which is the above-mentioned operation condition.

Similarly to the above-mentioned <the case of 2 mass % of $SiO_2$>, 853 kg, 995 kg of CaO and $SiO_2$ (1) as flux (prepared so that the slag composition was CaO:35 mass %, and $SiO_2$: 30 mass %.), and 1000 kg of $Al_2O_3$ automobile catalyst (2) as the treatment target member, 100 kg of Cu (3) as the extracting agent, and 15.7 kg of cokes as the extracting agent, were prepared when carrying out the first reduction smelting (5).

They were charged into the electric furnace, to thereby carry out the first reduction smelting (5) similarly to <the case of 2 mass % of $SiO_2$>. As a result, the molten metal of the Cu alloy (6) was settled under the $CaO$—$SiO_2$—$Al_2O_3$ slag (7). The Pt amount in the $CaO$—$SiO_2$—$Al_2O_3$ was 0.04030 kg, and the Pt amount in the Cu alloy (6) was 4.9597 kg. By using these values, 0.0003 of the distribution ratio of Pt was obtained in the reduction smelting (5) calculated by the above-mentioned values.

The molten metal of the Cu alloy (6) was shifted to the oxidation furnace, and similarly to <the case of 2 mass % of $SiO_2$>, the first oxidation smelting (9) was carried out without adding $SiO_2$ (8) as oxide. Meanwhile, the $CaO$—$SiO_2$—$Al_2O_3$ slag (7) was discarded.

As a result, the Cu-PGM alloy (10) was settled under the $Cu_2O$ slag (11) layer. Since the distribution ratio of Pt in this oxidation smelting (9) was 0.05, the Pt amount in the $Cu_2O$ slag (11) was 2.825 kg, and the Pt amount in the Cu-PGM alloy (10) was 2.135 KG, and 50% Pt was contained therein. The distribution ratio of Pt in this oxidation smelting (9) calculated using the above-mentioned values, was 0.05.

The obtained $Cu_2O$ slag (11), CaO and $SiO_2$ (1) as flux, 1000 kg of the $Al_2O_3$ automobile catalyst (2) as the treatment target member, and additional Cu (3) as the extracting agent, were prepared.

Here, 97.87 kg of Cu was contained in the $Cu_2O$ slag (11). Therefore, 853 kg, 995 kg of CaO and $SiO_2$ (1) were prepared as flux, and 2.13 kg of Cu (3) was prepared as the extracting agent.

They were charged into the electric furnace, and the second reduction smelting (5) was carried out under the same condition as the first time, excluding the point that 24.9 kg of cokes (4) was used as the reducing agent. As a result, the molten metal of the Cu alloy (6) was settled under the $CaO$—$SiO_2$—$Al_2O_3$ slag (7) layer. The Pt amount in the $CaO$—$SiO_2$—$Al_2O_3$ slag (7) layer was 0.06142 kg, and the Pt amount in the Cu alloy (6) was 7.769 kg. The distribution ratio of Pt in the reduction smelting (5) calculated using these values, was 0.0003.

The molten metal of the Cu alloy (6) was shifted to the oxidation furnace, and the second oxidation smelting (9) was carried out under the same condition as the first time, without adding $SiO_2$ (8) as oxide. Meanwhile, the $CaO$—$SiO_2$—$Al_2O_3$ slag (7) was discarded.

As a result, the Cu-PGM alloy (10) was settled under the $Cu_2O$ slag (11) layer. The Pt amount in the $Cu_2O$ slag (11) was 2.742 kg. The Pt amount in the Cu-PGM alloy (10) was 5.027 kg, and 50% Pt was contained therein. The distribution ratio of Pt in this oxidation smelting (9) calculated using these values, was 0.05.

The obtained $Cu_2O$ slag (11), CaO and $SiO_2$ (1) as flux, 1000 kg of $Al_2O_3$ automobile catalyst (2) as the treatment target member, and additional Cu (3) as the extracting agent, were prepared.

Here, 94.97 kg of Cu was contained in the $Cu_2O$ slag (11). Therefore, 853 kg, 995 kg of CaO and $SiO_2$ (1) were prepared as flux, and 5.03 kg of Cu (3) was prepared as the extracting agent.

They were charged into the electric furnace, and the reduction smelting (5) was carried out three times under the same condition as the first time, excluding the point that 24.2 kg of cokes (4) was used as the reducing agent. As a result, the molten metal of the Cu alloy (6) was settled under the $CaO$—$SiO_2$—$Al_2O_3$ slag (7) layer. The Pt amount in the $CaO$—$SiO_2$—$Al_2O_3$ slag (7) layer was 0.06077 kg, and the Pt amount in the Cu alloy (6) was 7.679 kg. The distribution ratio of Pt in the reduction smelting (5) calculated using these values, was 0.0003.

The molten metal of the Cu alloy (6) was shifted to the oxidation furnace, to thereby carry out the third oxidation smelting (9) under the same condition as the first time, without adding $SiO_2$ (8) as oxide. Meanwhile, the $CaO$—$SiO_2$—$Al_2O_3$ slag (7) was discarded.

As a result, the Cu-PGM alloy (10) was settled under the $Cu_2O$ slag (11) layer. The Pt amount in the $Cu_2O$ slag (11) was 2.744 kg. The Pt amount in the Cu-PGM alloy (10) was 4.935 kg, and 50% Pt was contained therein. The distribution ratio of Pt in this oxidation smelting (9) calculated using the above-mentioned values, was 0.05.

As described above, 3000 kg (Pt:15 kg) of the $Al_2O_3$ automobile catalyst (2) was treated by the reduction smelting (5) and oxidation smelting (9) three times, to thereby obtain 12.097 kg of Pt in the Cu-PGM alloy (10) in total (first 2.135 kg+second 5.027 kg+third 4.935 kg), as Pt in the Cu-PGM alloy (10). Meanwhile, Pt in the ROSE process was 2.744 kg.

Example 2

The $Al_2O_3$ automobile catalyst (2) being the treatment target member, was treated under a similar operation condition as example 1, excluding a point that 50 kg of Cu (3) as the extracting agent, was prepared.

<The Case of 2 Mass % of $SiO_2$>

Figure 8:
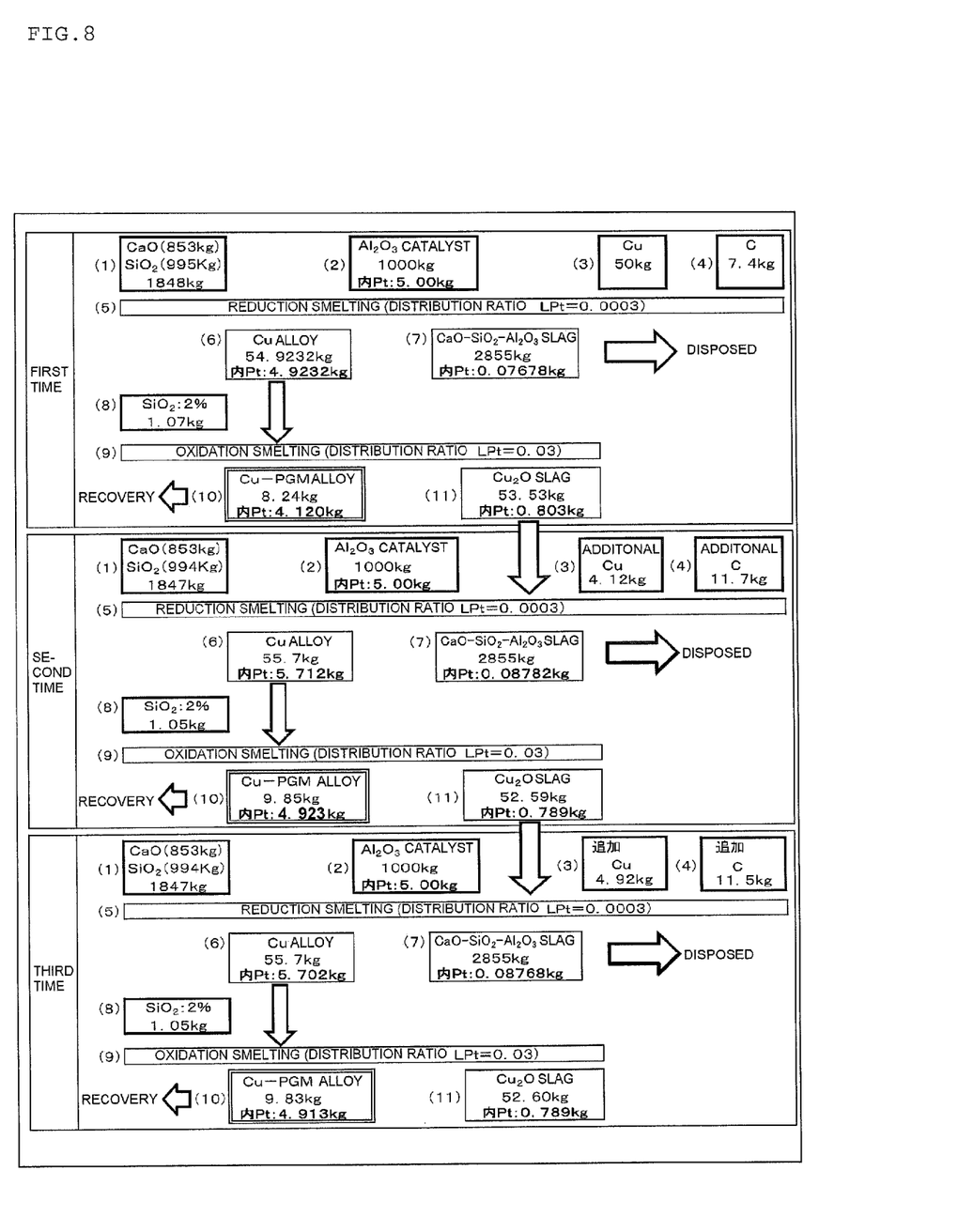
FIG. 8 is a mass flowchart in a case of setting $SiO_2$ addition amount to 2 mass % as the acidic oxide, and setting the Cu amount to 50 kg.

FIG. 8 shows the distribution behavior of Pt in the ROSE process of the present invention, when $SiO_2$ (8) being the oxide in the $Cu_2O$ slag (11) containing PGM is set to 2 mass %, on the premise that the mass ratio of the Cu alloy (6) and the $Cu_2O$ slag (11) is around 1:6 (first to third times). In this figure, the same description method as example 1 is used.

3000 kg (Pt:15 kg) of the $Al_2O_3$ automobile catalyst (2) was treated by the reduction smelting (5) and oxidation smelting (9) three times, to thereby obtain 13.956 kg of Pt in the Cu-PGM alloy (10) in total (first 4.120 kg+second 4.923 kg+third 4.913 kg), as Pt in the Cu-PGM alloy (10). Meanwhile, Pt in the ROSE process was 0.789 kg.

<The Case of 5 Mass % of $SiO_2$>

Figure 9:
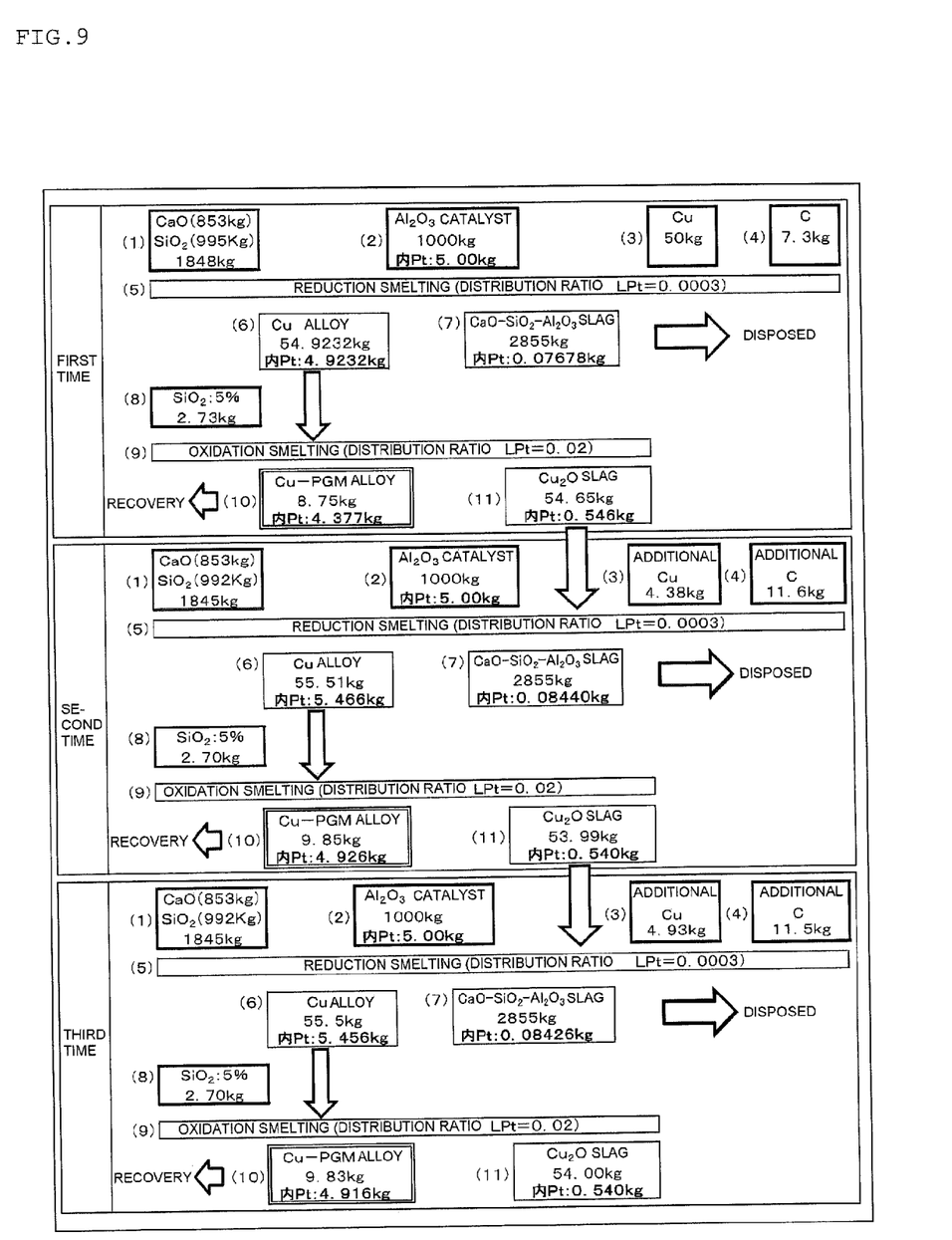
FIG. 9 is a mass flowchart in a case of setting the $SiO_2$ addition amount to 5 mass % as the acidic oxide, and setting the Cu amount to 50 kg.

FIG. 9 shows the distribution behavior of Pt in the ROSE process of the present invention, when $SiO_2$ (8) being the oxide in the $Cu_2O$ slag (11) containing PGM is set to 5 mass %, on the premise that the mass ratio of the Cu alloy (6) and the $Cu_2O$ slag (11) is around 1:6 (first to third times). In this figure, the same description method as example 1 is used.

3000 kg (Pt:15 kg) of the $Al_2O_3$ automobile catalyst (2) was treated by the reduction smelting (5) and oxidation smelting (9) three times, to thereby obtain 14.219 kg of Pt in the Cu-PGM alloy (10) in total (first 4.377 kg+second 4.926 kg+third 4.916 kg), as Pt in the Cu-PGM alloy (10). Meanwhile, Pt in the ROSE process was 0.540 kg.

<The Case of 0 Mass % of $SiO_2$>

Figure 10:
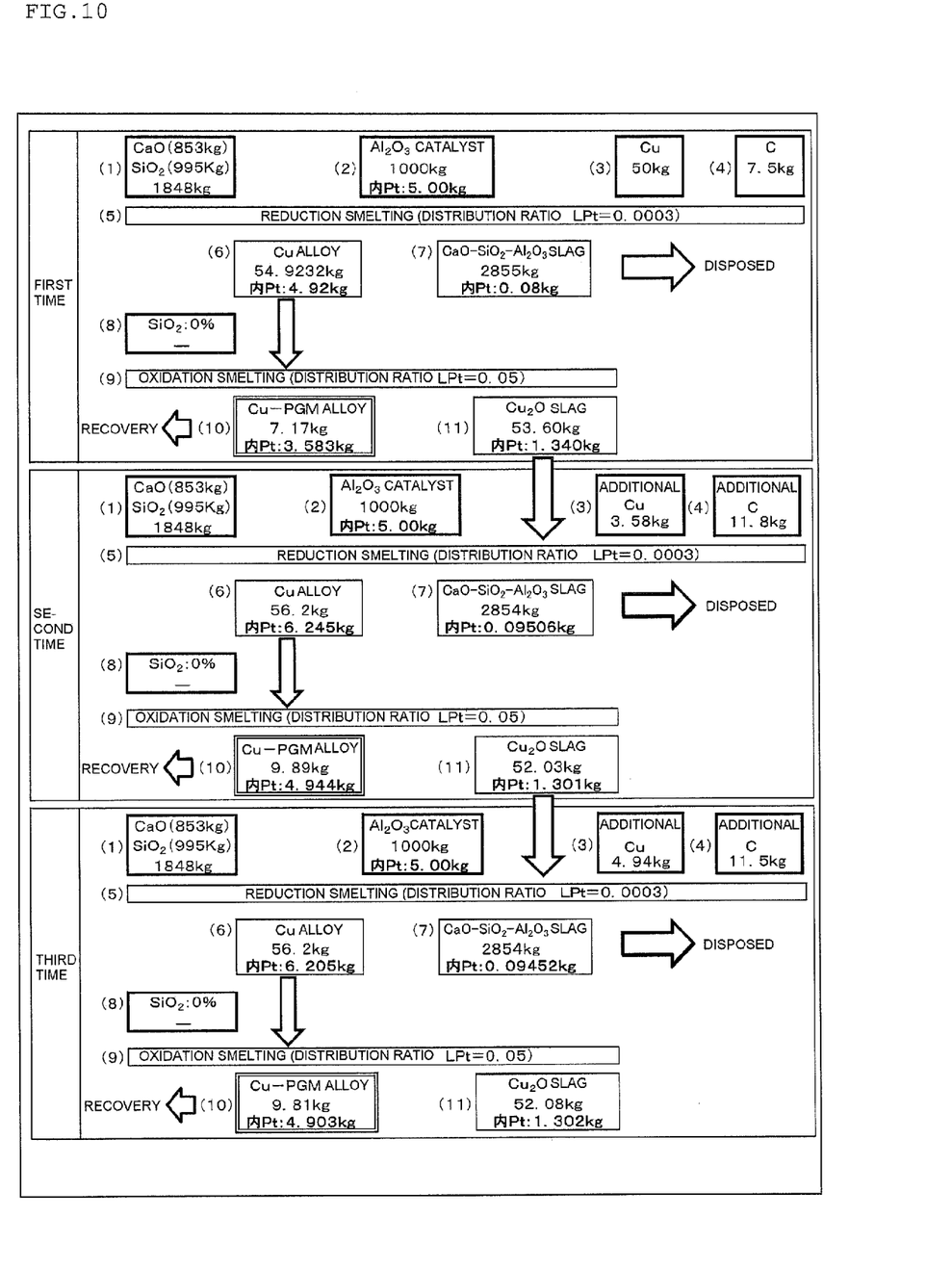
FIG. 10 is a mass flowchart in a case of setting the Cu amount to 50 kg without adding $SiO_2$ as the acidic oxide.

Next, FIG. 10 shows the distribution behavior of Pt in the ROSE process of the present invention in the case of not adding $SiO_2$ (8) as oxide. The description method in this figure is the same as example 1.

3000 kg (Pt:15 kg) of the $Al_2O_3$ automobile catalyst (2) was treated by the reduction smelting (5) and oxidation smelting (9) three times, to thereby obtain 13.43 kg of Pt in the Cu-PGM alloy (10) in total (first 3.583 kg+second 4.944 kg+third 4.903 kg), as Pt in the Cu-PGM alloy (10). Meanwhile, Pt in the ROSE process was 1.302 kg.

CONCLUSION

As described above, regarding the distribution behavior of Pt in the ROSE process of the present invention shown in FIG. 5 to FIG. 10 in examples 1 and 2, results were totaled, from a viewpoint of the Pt mass (three times in total) in the Cu-PGM alloy, the Pt mass (third time) in the $Cu_2O$ slag, and the Pt mass (three times in total) in the $CaO$—$SiO_2$—$Al_2O_3$ slag, and the results are shown in table 2.

From table 2, it is found that the Pt amount circulated in the ROSE process can be remarkably reduced in both of the examples 1 and 2, by adding $SiO_2$ when carrying out the oxidation smelting. Meanwhile, the Pt mass (three times in total) in the Cu-PGM alloy was increased. On the other hand, the Pt mass in the $CaO$—$SiO_2$—$Al_2O_3$ slag is also reduced, with remarkable reduction of the Pt amount circulated in the ROSE process.

As described above, by adding the acidic oxide or the basic oxide like $SiO_2$ in the process of the oxidation smelting of the ROLSE process, a preferable result of improving productivity can be obtained from the viewpoint of each of the Pt mass in the Cu-PGM alloy, the Pt mass in the $Cu_2O$ slag, and the Pt mass in the $CaO$—$SiO_2$—$Al_2O_3$ slag.

Further, it can be considered that the above-mentioned effects of examples 1 and 2 can be exhibited in PGM, from a behavior comparison between Pt, and Rh, Pd described in the "Modes for carrying out the invention". Also, it can be considered that the effects of the examples 1 and 2 can be exhibited even when the basic oxide is added into the $Cu_2O$ slag, from the behavior comparison between $SiO_2$ added into the $Cu_2O$ slag, and at least one kind selected from a group consisting of $SiO_2$, $Na_2O$, $Na_2CO_3$ and $NaHCO_3$, similarly as described in the "Mode for carrying out the invention".

TABLE 2

| Cu charging amount for every time (Kg) | SiO$_2$ addition amount for every time (mass %) | Pt weight (three times in total) in Cu-PGM alloy (Kg) | Pt weight (third time) in CuO$_2$ slag (Kg) | Pt weight (three times in total) in CaO—SiO$_2$—Al$_2$O$_3$ slag (Kg) |
|---|---|---|---|---|
| 100 | 2 | 13.184 | 1.664 | 0.14686 |
|  | 5 | 13.724 | 1.138 | 0.13889 |
|  | — | 12.097 | 2.744 | 0.1627 |
| 50 | 2 | 13.956 | 0.789 | 0.25228 |
|  | 5 | 14.219 | 0.54 | 0.24544 |
|  | — | 13.43 | 1.302 | 0.27012 |

The invention claimed is:

1. A method of recovering Platinum Group Metals (PGM), the method comprising:
   carrying out reduction smelting to a treatment target member containing PGM, at least one of Cu and Cu$_2$O, and flux, to thereby generate a molten slag and a Cu alloy containing PGM; and
   oxidizing and melting the Cu alloy containing the PGM, to thereby generate a Cu$_2$O slag containing PGM and the Cu alloy, with more concentrated PGM concentration than the Cu alloy containing the PGM,
   wherein when carrying out the oxidizing and melting, acidic oxide or basic oxide is added,
   the acidic oxide is SiO$_2$, and
   the basic oxide is at least one kind selected from a group consisting of Na$_2$O, Na$_2$CO$_3$, and NaHCO$_3$.

2. The method of recovering PGM according to claim 1, wherein SiO$_2$ content in the Cu$_2$O slag containing the PGM, is set to 0.01 mass % or more and 10.0 mass % or less by adding the SiO$_2$.

3. The method of recovering PGM according to claim 2, wherein the Cu$_2$O slag containing PGM generated in the oxidizing and melting, is charged to a reduction smelting process performed thereafter.

4. The method of recovering PGM according to claim 1, wherein Na$_2$O conversion content of the basic oxide in the Cu$_2$O slag containing the PGM, is set to 0.01 mass % or more and 20.0 mass % or less.

5. The method of recovering PGM according to claim 4, wherein the Cu$_2$O slag containing PGM generated in the oxidizing and melting, is charged to a reduction smelting process performed thereafter.

6. The method of recovering PGM according to claim 1, wherein the Cu$_2$O slag containing PGM generated in the oxidizing and melting, is charged to a reduction smelting process performed thereafter.

* * * * *